Figure 1:
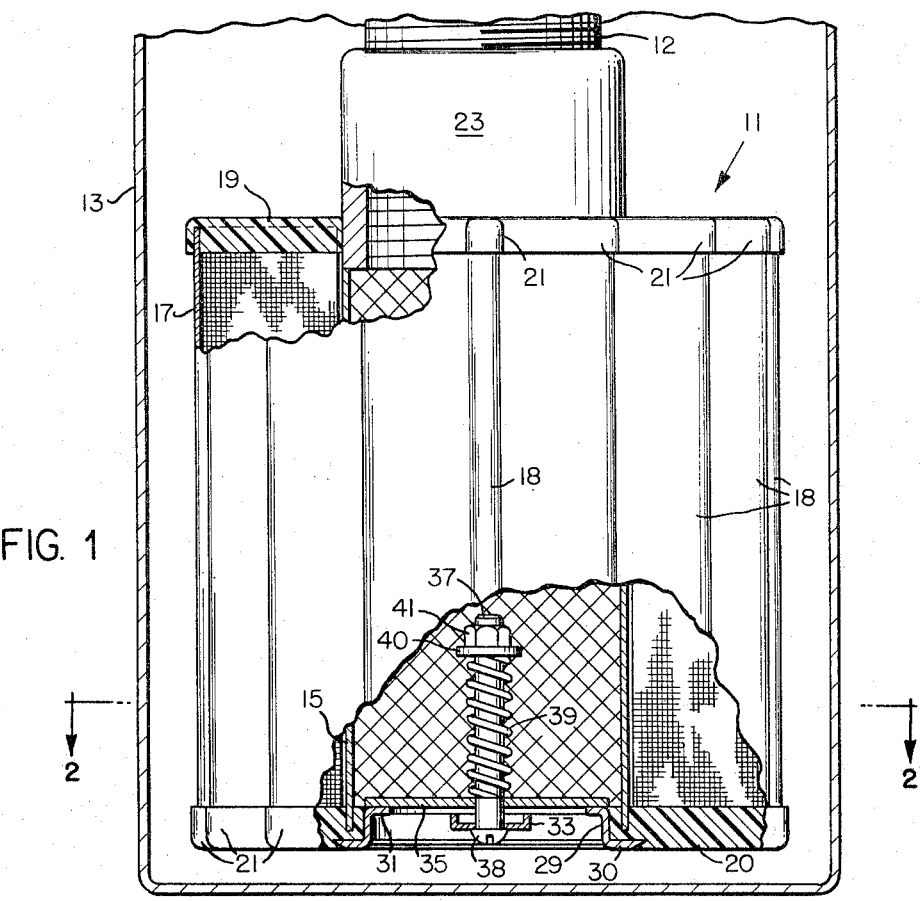

INVENTOR.
PAUL F. WILBER
BY
ATTORNEY

United States Patent Office 3,295,680
Patented Jan. 3, 1967

3,295,680
FILTER ASSEMBLY HAVING A BY-PASS VALVE
Paul F. Wilber, Richland, N.Y., assignor to Dollinger
Corporation, Rochester, N.Y., a corporation of New
York
Filed July 1, 1964, Ser. No. 379,448
2 Claims. (Cl. 210—130)

This invention relates to filters having replaceable filter cartridges, and more particularly to filters for liquids that are apt to be subjected to extreme changes in viscosity. In a more specific aspect the invention relates to filters with replaceable, pleated or fluted filter elements, which are held in pleated condition by end caps that are molded over opposite ends of each filter element to secure its pleats in place, and to seal opposite ends of the element. The fluid, which is to be filtered passes through the filter element and is discharged through a duct in one of the end caps communicating with the central bore of the filter element.

In cold weather it is hard to start an engine or hydraulic system. The oil in the engine crank case, or the fluid in the hydraulic system sump, is so thick or viscous that it will not flow easily. If a filter of the type described is employed in the system, the filter adds to the difficulties in starting because it is extremely difficult for the oil or fluid to pass radially through the pores in the filter element. As a consequence, inadequate quantities of oil or fluid pass through the filter until the engine or system has been running long enough to warm up. There is therefore great danger of scoring pistons and cylinders of an engine or hydraulic system in cold weather, particularly where the engine or system has been standing idle in a cold garage or hangar or in a cold factory for a relatively long time, as over a weekend.

An object of this invention is to provide an improved filter for fluids, and which is particularly adapted for cold weather use.

Another object of this invention is to provide an improved filter cartridge, which is relatively simple and inexpensive to manufacture, and through which fluid is adapted to flow at a relatively uniform rate, regardless of changes in viscosity of the fluid.

A further object of this invention is to provide an improved filter of the type described having means for by-passing the fluid, under cold weather conditions and while it has relatively high viscosity, through the bore of the filter, rather than causing the fluid to flow through the pores of the filter element.

Other objects of the invention will be apparent hereinafter from the specification and from the recital of the appended claims, particularly when read in conjunction with the accompanying drawing.

Figure 2:
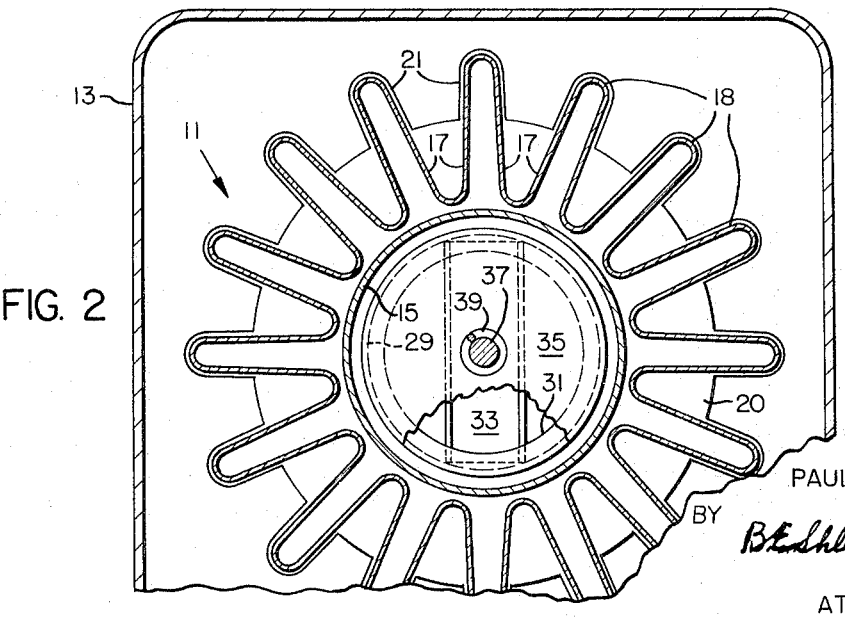

In the drawing:

FIG. 1 is a fragmentary view, showing the sump of a hydraulic system in section, and showing suspended therein a filter made in accordance with one embodiment of this invention, parts of the filter being cut away; and FIG. 2 is a fragmentary sectional view taken along the line 2—2 in FIG. 1 and looking in the direction of the arrows.

The filter illustrated is for use in a hydraulic system in which oil is pumped from a sump, into the hydraulic system, and back into the sump. The filter is suspended in the sump by means of a pipe, which is connected at one end to the central bore of the filter, and at its opposite end to the system pump. When the system pump is started, it creates a vacuum which causes oil in the sump to be drawn radially inwardly through the pleated walls of the filter to its central bore, and then to be passed through the pipe and pump to the hydraulic system.

Mounted in one end of the filter bore is a normally closed pressure-operated valve. If for some reason the ambient system temperature falls to a point at which the oil in the sump becomes so viscous that its radial flow through the filter is considerably retarded, the bore in the filter is subjected to sufficient vacuum to cause the pressure-operated valve to open against the resistance of a spring, thereby permitting "unfiltered" oil to be drawn from the sump directly through the central bore of the filter to the pump, and to be passed thence into the system. Once the system is in operation the temperature of the oil will increase, thereby decreasing the viscosity of the oil until it becomes thin enough to flow freely through the filter element at some predetermined minimum rate. At this point the vacuum in the filter bore is no longer great enough to hold the by-pass valve open, and the spring closes the valve to shut off the flow of "unfiltered" oil.

Referring now to the drawing by numerals of reference, 11 designates a filter made in accordance with one embodiment of this invention; and 12 denotes a pipe by means of which the filter 11 is adapted to be suspended in the oil sump 13 of a hydraulic system.

Filter 11 is of the radial fin type, and comprises a cylindrical inner screen 15 of finely woven wire, and a surrounding outer screen 17, which is of similar material, and which is formed with radially-directed and axially-extending pleats 18. The radially inner ends of the pleats are slightly spaced radially from the inner screen 15, and a porous filter element, for instance felted cloth, may be mounted on the outer screen 17 to cover the pleats.

At both ends the screen 17 is embedded in molded plastic end caps 19 and 20, respectively, each of which is formed with a plurality of integral, radially-disposed fingers 21 in which opposite ends of the pleats 18 are embedded.

Secured at one end thereof in an axial bore in the end cap 19 is an internally threaded coupling member 23. At its lower end the coupling member 23 abuts the upper end (FIG. 1) of the inner screen 15 coaxially thereof.

Secured in a central bore in the end cap 20, and lying radially inwardly of the inner screen 15 coaxially thereof, is a metallic ring or end cap 29. At its outer end the cap 29 has an integral, radially-outwardly projecting ring flange 30, which is molded to the end cap 20, and which sealingly engages the end cap 20 around its central bore. At its inner end the cap 29 has an integral, radially-inwardly projecting ring flange 31, which is adapted to form a valve seat as described below.

Extending diametrally across and engaging the underside of the ring flange 31 is a rigid, generally U-shaped, removable rib or channel member 33. Removably seated around its marginal edge against the upper face of the ring flange 31 is a disc-shaped valve 35. Projecting through aligned apertures in the rib 33 and the valve 35, and extending into the central bore in the filter 11 coaxially of the screen 15, is a screw or bolt 37. At its lower end screw 37 has a head 38, which abuts the outer face of the rib 33. The screw 37 is surrounded by a coiled compression spring 39. Spring 39 at its lower end engages the upper face of the valve 35, and at its upper end engages a washer 40 which is slidable on the screw 37. The tension of spring 39 is adjusted by adjustment of a nut 41, which threads on the upper end of bolt 37, and which engages the upper face of washer 40. The spring 39 is maintained in a slightly compressed condition so that it draws the head 38 of bolt 37 against the rib 33, thereby urging the latter resiliently against the lower face of flange 31, and also urging the valve 35 resiliently into sealing engagement with the upper face of the flange 31.

In operation, the filter 11, which is removably mounted by its coupling 23 on the end of the pipe 12, is suspended by pipe 12 in the sump or reservoir 13 of a hydraulically operated system. During normal operation the filter 11 is completely immersed in a hydraulic fluid (oil or the like) in the sump 13; and the spring 39 causes the valve 35 to be urged to and held in its closed position as shown in FIG. 1. At this time, the system pump (not shown) causes fluid in the sump 13 to be drawn radially inwardly through the screens 17 and 15 to the pipe 12, through which it is pumped through the system and returned again to the sump 13. Fluid is thus constantly circulated through the system, and upon returning to the sump 13 it is once again filtered through the screens 17 and 15 before being pumped back into the system.

If for some reason the ambient temperature of the system should become so low that the viscosity of the fluid in the sump 13 should rise considerably above its normal value—for instance, when the system has been shut down for a period of time, and the room temperature in which the system is located has fallen so low that the fluid in the sump has become thick and sluggish—more work is required to draw the hydraulic fluid in the sump 13 radially inwardly through the screens 17 and 15. Therefore, when the system pump is turned on, the vacuum or suction created by the system pump is increased, causing the valve 35 to be forced open against the resistance of the spring 39, thereby permitting fluid in the sump to pass directly through the opened valve and axially of the filter 11 to the pump, without first passing radially through the screens 17 and 15. The valve 35 remains open and permits fluid in the sump 13 to bypass the filtering screens 17 and 15 until such time as the temperature of the hydraulic fluid has been elevated sufficiently to effect a lowering of the viscosity of the hydraulic fluid to a point where the fluid is once again thin enough to flow radially through the screens 17 and 15 in a normal fashion. At such time the spring 39 will once again urge the valve 35 back to its closed position as shown in FIG. 1, so that the fluid in the sump 13 must once again pass through the screens 17 and 15 before entering the system pump.

From the foregoing it will be apparent that applicant has provided a relatively simple and inexpensive device which will permit hydraulic systems to be operated safely, even in abnormally cold temperatures. Heretofore filters in systems of the type described were sealed at both the top and bottom thereof, so that the hydraulic fluid had to pass radially inwardly through the filtering screens before passing to the system pump. In cold weather operation, when the increased viscosity of the fluid caused the flow of hydraulic fluid through the filter to be reduced considerably, if not interrupted completely, inadequate quantities of the hydraulic fluid were passed through the pump to the system proper, thereby resulting in inadequate lubrication and consequent scoring or burning of the moving parts of the pump, and also causing a failure of the system as a whole.

With applicant's novel filter, on the other hand, the valve 35 opens, when the radial flow of the fluid through the filter is reduced below a certain rate, thereby assuring that adequate quantities of the fluid will flow axially through the center of the filter to the system pump, in effect bypassing the filter, until such time that the viscosity of the fluid is lowered to a point where it can readily flow radially through the filters 17 and 15 at a rate sufficient to supply the needs of the system pump. At this time the bypass valve 35 will automatically close so that only filtered fluid will be passed to the pump.

By adjusting the nut 41 on the screw 37 the tension on the compression spring 39 may be adjusted, thereby effecting a corresponding adjustment of the critical fluid pressures at which the valve 35 will open and close.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. A filter comprising
   (a) a porous filter element having an axial bore, and formed with axially-extending pleats which project radially outwardly from said bore,
   (b) a pair of end caps secured over opposite ends, respectively, of said element and having central openings aligned axially with said bore,
   (c) a coupling secured centrally to one of said caps for connecting its opening and said bore with the suction side of a pump, operable to pump fluid through said element,
   (d) a ring sealingly secured in the central opening of the other of said caps in axial alignment with said coupling and having on its inner end an integral, radially inwardly projecting ring flange,
   (e) a rigid rib extending diametrally across said ring to seat at opposite ends against the outer face of said flange,
   (f) a disc-shaped valve in said bore to be seated around its marginal edge against the inside face of said flange to close the ring and the central opening in said other cap, whereby when said valve is closed, fluid may pass only radially through the pores in said element to be filtered thereby,
   (g) a bolt having a shank which extends through registering central apertures in said rib and said disc into said bore coaxially thereof, and having a head portion, which seats against the outer face of said rib,
   (h) a nut adjustably secured to one end of said bolt, and
   (i) a compression spring surrounding said shank and seating at one end against said valve resiliently to hold said valve and said rib against said inner and said outer faces, respectively, of said flange,
   (j) said nut and bolt being adjustable relative to one another to adjust the tension in said spring, whereby when the pressure differential created by said pump between said bore and the outside of said element exceeds a predetermined value, atmospheric pressure is operative to force said valve axially away from said flange against the resistance of said spring, whereby fluid may flow directly axially through said bore.

2. A filter as defined in claim 1 wherein
   (a) a cylindrical screen is mounted within said porous element in radially spaced relation thereto,
   (b) said screen at one end thereof is embedded in said other end cap between said porous element and said ring coaxially thereof, and
   (c) said coupling at its inner end abuts the opposite end of said screen coaxially thereof.

References Cited by the Examiner

UNITED STATES PATENTS

| | | | |
|---|---|---|---|
| 1,195,983 | 8/1916 | Farmer | 55—311 |
| 2,183,616 | 12/1939 | Korte | 210—130 |
| 2,352,315 | 6/1944 | Gilbert | 210—130 |
| 2,565,764 | 8/1951 | Flanagan | 55—309 X |
| 2,962,121 | 11/1960 | Wilber | 210—493 X |

REUBEN FRIEDMAN, *Primary Examiner.*

F. A. SPEAR, *Assistant Examiner.*